United States Patent
Jones et al.

(10) Patent No.: US 9,394,980 B2
(45) Date of Patent: Jul. 19, 2016

(54) NO-BACK ARRANGEMENT

(75) Inventors: Tony Jones, Birmingham (GB); Michael Paul Somerfield, Stoke-on-Trent (GB); Edward George Hill, Redditch (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 944 days.

(21) Appl. No.: 12/893,524

(22) Filed: Sep. 29, 2010

(65) Prior Publication Data

US 2011/0073421 A1     Mar. 31, 2011

(30) Foreign Application Priority Data

Sep. 29, 2009   (GB) ................................... 0917059.8

(51) Int. Cl.
  *F16D 67/02*  (2006.01)
  *F16H 25/24*  (2006.01)
  *F16D 125/38*  (2012.01)

(52) U.S. Cl.
  CPC ............ *F16H 25/2454* (2013.01); *F16D 67/02* (2013.01); *F16D 2125/38* (2013.01)

(58) Field of Classification Search
  CPC .. F16D 67/02; F16D 2125/38; F16H 25/2454
  USPC ............... 188/61, 134, 181 T, 189; 74/89.39; 192/55.1, 2, 12 B
  See application file for complete search history.

(56) References Cited

U.S. PATENT DOCUMENTS

| | | | | |
|---|---|---|---|---|
| 4,318,304 A | * | 3/1982 | Lang | 74/89.38 |
| 4,603,594 A | * | 8/1986 | Grimm | 74/89.39 |
| 4,697,672 A | | 10/1987 | Linton | |
| 4,834,225 A | * | 5/1989 | Klopfenstein et al. | 192/223 |
| 4,909,363 A | * | 3/1990 | Trommer | 192/223.3 |
| 5,655,636 A | * | 8/1997 | Lang et al. | 192/223 |
| 6,109,415 A | * | 8/2000 | Morgan et al. | 192/223.1 |
| 6,202,803 B1 | * | 3/2001 | Lang | 188/134 |
| 6,974,015 B2 | * | 12/2005 | Gamache | 192/223.3 |
| 2003/0084736 A1 | * | 5/2003 | Darby | 74/89.23 |
| 2006/0163026 A1 | | 7/2006 | Lang | |
| 2009/0090204 A1 | * | 4/2009 | Jones et al. | 74/89.39 |

FOREIGN PATENT DOCUMENTS

EP   1980770    10/2008

OTHER PUBLICATIONS

European Search Report dated Jan. 21, 2011.

\* cited by examiner

*Primary Examiner* — Bradley King
(74) *Attorney, Agent, or Firm* — Cantor Colburn LLP

(57) ABSTRACT

A no-back arrangement is disclosed for use in applying a braking load to a rotary actuator member, the no-back arrangement comprising a no-back device operable to apply a braking load to the rotary actuator member when the rotary actuator member is subject to a tensile loading, and limit means operable to limit the magnitude of the applied braking load.

10 Claims, 2 Drawing Sheets

NO-BACK ARRANGEMENT

Figure 1:
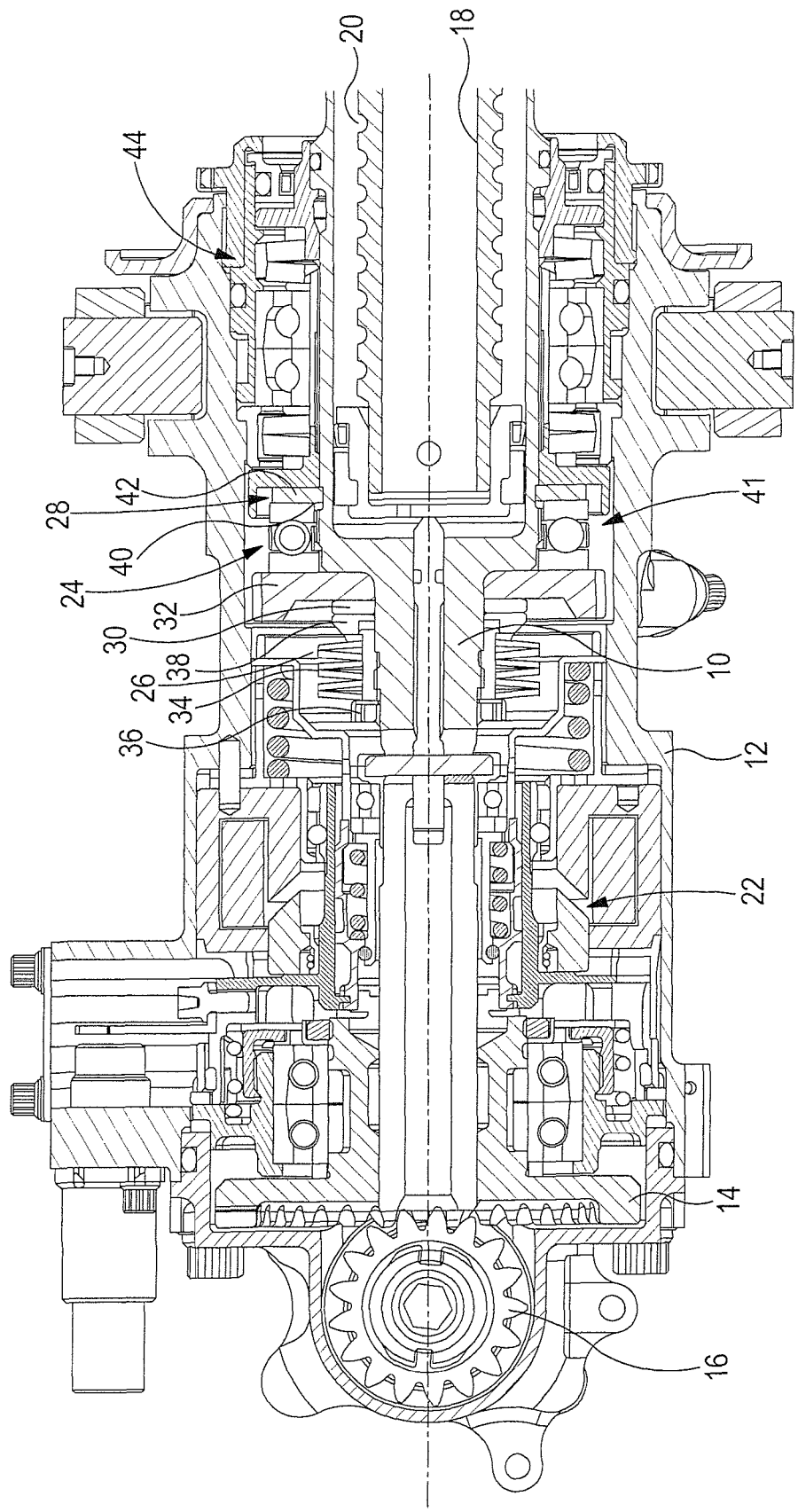

This invention relates to a no-back arrangement, and in particular to the no-back arrangement suitable for use with an actuator for use in driving part of a thrust reverser system between stowed and deployed positions.

It is known to use screw-jack type actuators to drive the cowls of a thrust reverser system for movement. Typically, during the initial part of the cowl movement, during deployment, the actuator has to positively drive the cowl for movement. Once the cowl has moved into the airflow through the engine with which the thrust reverser system is associated, the aerodynamic loadings on the cowl will tend to drag the cowl towards its fully deployed position. As uncontrolled movement of the cowl to its deployed position carries the risk of damage thereto, and the motor and associated circuits used to drive the actuator may be unable to withstand the continued application of regenerative currents that may arise from such movement, it is known to provide so-called no-back devices which serve to apply a braking load to the actuator in such circumstances, resisting deployment. The gain of the no-back devices is typically slightly greater than unity, i.e. the no-back is designed, for a given applied tensile load, to apply a braking load slightly greater than that necessary to resist extension of the actuator. The motors used to drive the actuators are sized to allow them to overcome the braking load applied as a result of the operation of the no-back device.

Where it is necessary to abort the take-off of an aircraft that has already started to accelerate along the runway (known as rejected take-off or RTO), the aircraft's thrust reverser system may be deployed to assist the wheel brakes in slowing the aircraft. During a normal deployment of the thrust reverser cowls, on landing, the engine is already at or around idle speed. When deployed in the event of an RTO, the engine is still slowing down from maximum thrust speed, thus the airflow into which the cowls are being moved is at a much higher speed than is experienced under normal deployment conditions. Consequently, the force necessary to commence movement is higher than during a normal deployment, and the aiding loads subsequently urging the cowls to their deployed position will also be very high. Although the provision of a no-back device capable of withstanding such loadings is possible, such a device would be of significantly increased size and weight compared to a typical no-back device designed to operate under normal thrust reverser deployment loads. Alternatively, the gain of the no-back could be increased, but this would require the associated motor and control circuits to be of increased power, weight and size in order to be able to overcome such a magnitude of applied braking load both during normal and RTO operation. Such increases in size and weight are not desirable in aerospace applications. If, rather than use a no-back device of increased size and weight, a no-back device sized to operate just under normal landing conditions were used, the no-back device would be unable to hold the cowl against movement under the very high tensile loads experienced during an RTO situation, and slipping of the no-back friction parts under high tensile load would cause the temperature of the no-back device, or parts thereof, to rise considerably beyond the normal working temperature thereof which may lead to permanent damage or failure thereof.

It is an object of the invention to provide a no-back arrangement in which at least some of the disadvantages outlined hereinbefore are overcome or are of reduced effect.

According to one aspect of the invention there is provided a no-back arrangement for use in applying a braking load to a rotary actuator member, the no-back arrangement comprising a no-back device operable to apply a braking load to the rotary actuator member when the rotary actuator member is subject to a tensile loading, and limit means operable to limit the magnitude of the applied braking load.

Such an arrangement is advantageous in that, in the event that an excessively large tensile loading is applied to the rotary actuator member, the braking load applied by the no-back device does not exceed a rated maximum level, thus the generation of excessive operating temperatures is avoided and the likelihood of damage is reduced. As the braking load applied by the arrangement will be insufficient to resist movement of the actuator member under such overload conditions, other means for achieving this, for example appropriate control of an associated motor or a further mechanical load limiter, may be used to apply additional braking in these circumstances.

The no-back device conveniently comprises a friction disc resiliently compressed against a no-back disc by a spring arrangement, the limit means being operable to limit the compression of the spring arrangement. The spring arrangement conveniently comprises a disc spring pack.

The limit means preferably comprises a shoulder provided on the actuator member co-operable with an abutment after limited longitudinal movement of the actuator means has taken place.

The shoulder may be integral with the actuator member, or alternatively may be provided upon a component such as a nut mounted thereon.

The abutment is preferably associated with a load limiter device operable to resist rotation of the actuator member in the event of further longitudinal movement of the actuator member.

The invention further relates to an actuator incorporating such a no-back arrangement.

Figure 2:
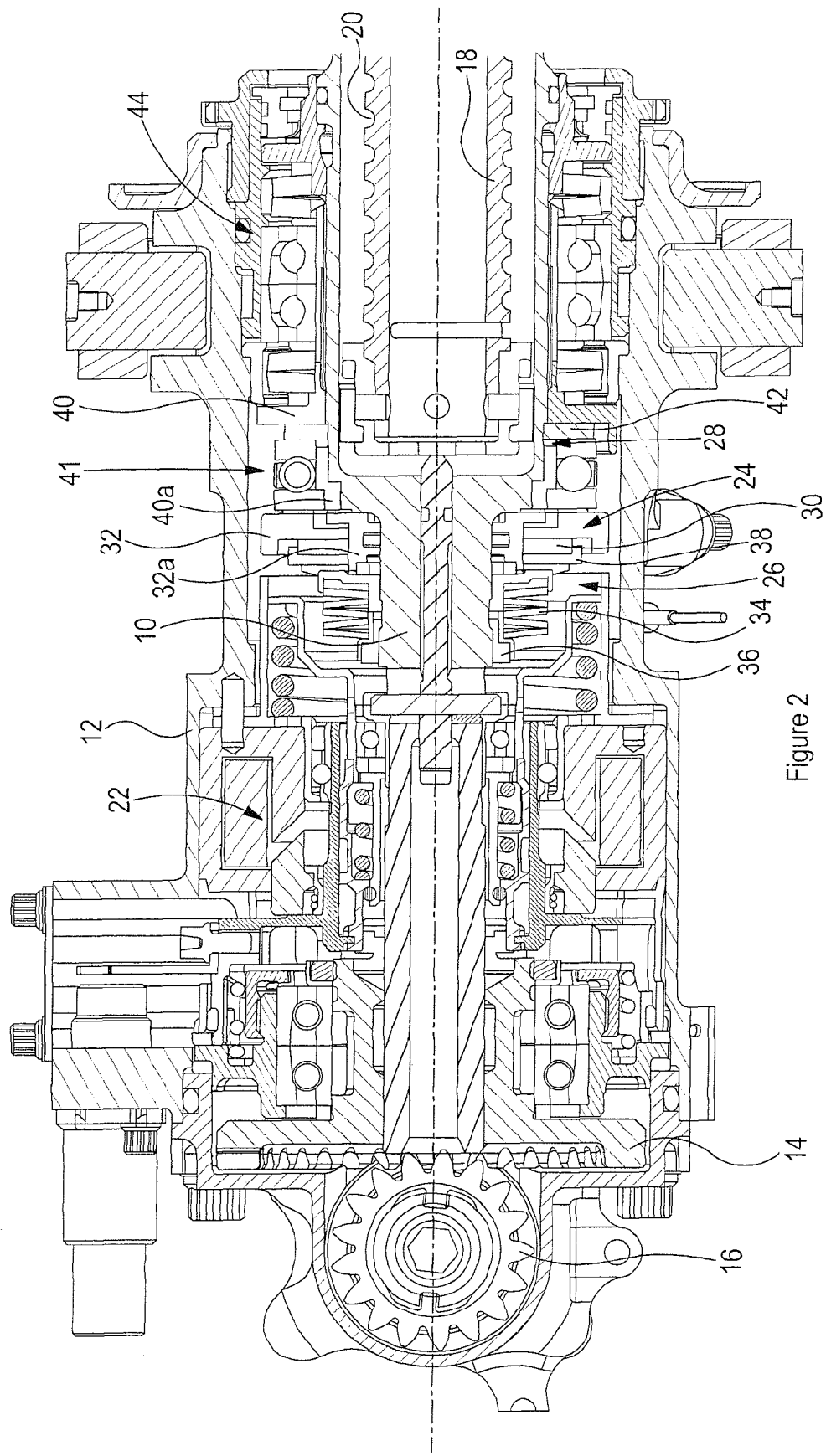

The invention will further be described, by way of example, with reference to the accompanying drawings, in which:

FIG. 1 is a sectional view of an actuator incorporating a no-back arrangement in accordance with one embodiment of the invention; and FIG. 2 is a view illustrating an alternative embodiment.

The actuator illustrated in FIG. 1 comprises a rotary actuator member 10 in the form of a shaft supported for rotation within a housing 12. The actuator member 10 is provided, at one end, with a face gear 14 arranged to be driven for rotation by a motor driven pinion gear 16. At its other end, the actuator member 10 is of hollow tubular form and defines or has secured thereto a nut component (not shown) which co-operates via a ball or roller-screw coupling (not shown) with an output shaft 18 provided on its outer surface with a thread formation 20. The output shaft is connected to a movable cowl of a thrust reverser system, in use, and the housing 12 is secured to a fixed part of an engine or aircraft wing structure. In use, operation of the motor to drive the actuator member 10 for rotation results in axial movement of the output shaft 18, and hence in translational movement of the cowl. The direction of movement of the cowl is dependent upon the rotary operating direction of the motor.

In practice, the cowl will have several such actuators associated therewith. The actuators will typically be synchronised, for example by being driven by a common motor.

A lock arrangement 22 is provided and is operable to lock the actuator member 10 against rotation, and hence to secure the cowl of the thrust reverser against movement other than when deployment of the thrust reverser system is required.

The actuator is provided with a no-back arrangement 24 comprising a no-back device 26 and a limit means 28 operable to limit the braking load applied by the no-back device 26. The no-back device 26 comprises a friction disc 30 compressed against a no-back disc 32, in the form of a ratchet ring, by a resilient spring arrangement in the form of a disc spring pack 34. The disc spring pack 34 is seated, at one end, against a nut 36 secured to the rotary actuator member 10, and bears, at its other end, against a pressure plate 38 that, in turn, bears against the friction disc 30. The pressure plate 38 is mounted upon the actuator member 10 by means (not shown) operable to ensure that the pressure plate rotates with the actuator member 10 whilst being capable of limited axial movement. The no-back disc 32 is provided, about its outer periphery, with ratchet teeth which are engaged by pawls (not shown) secured to the housing 12 with the result that the no-back disc 32 is able to rotate in one direction as the pawls ride over the ratchet teeth, rotation of the no-back disc 32 in the opposite direction being resisted by the interaction between the pawls and the ratchet teeth. The no-back devices of this general form, ie including a no-back disc in the form of a ratchet ring cooperable with pawls and against which a friction disc can bear, are well known.

The limit means 28 comprises a shoulder 40 provided on the rotary actuator member 10 which, in the position illustrated, is spaced by a small distance, for example about 1.5 mm, from an abutment in the form of a load disc 42 supported against a load limiter device 44, and supported by a thrust bearing 41 holding the load disc 42 at a fixed distance from the no-back disc 32.

In use, as mentioned hereinbefore, the motor is used to drive the actuator member 10 for rotation, and hence to drive the associated cowl between stowed and deployed positions. During deployment, aerodynamic loads on the cowl will, after initial movement of the cowl, urge the cowl towards its deployed position. These forces place tensile loads on the rotary actuator member 10, urging the actuator member 10 to the right in the orientation illustrated. The tensile loads are applied through the nut 36, spring pack 34, and pressure plate 38 to the friction disc 30, increasing the compression of the friction disc 30 against the no-back disc 32. The ratchet teeth of the no-back disc 32 are orientated to prevent rotation of the no-back disc 32 in the rotary direction associated with deployment, thus under tensile loads the co-operation of the friction disc 30 with the no-back disc 32 applies a braking load to the actuator member resisting deployment, the braking load being transmitted to the actuator member by virtue of the non-rotatable nature of the means by which the pressure plate 38 is mounted upon the actuator member 10. It will thus be appreciated that uncontrolled movement of the cowl towards its deployed position is avoided. During this mode of operation, the shoulder 40 remains spaced from the load disc 42, thus the limit means 28 is inactive.

In order to move the cowl to its fully deployed position, the motor continues to operate, the motor being sized so as to be able to overcome the braking loads so applied, and thus to be able to continue to drive the cowl for movement.

During retraction of the cowl back to its stowed position, the actuator member 10 will typically still be under tension thus the no-back device 26 will continue to resist relative rotation between the actuator member 10 and the no-back disc 32. However, as the nature of the ratchet teeth and pawls associated therewith permit rotation of the no-back disc 32 in this direction, the no-back device 26 does not resist retracting movement.

When the cowl is to be deployed during an RTO situation, as outlined hereinbefore the aerodynamic loadings on the cowl are significantly greater than those experienced during normal deployment. Consequently, the tensile loadings on the actuator member 10 are higher than would occur in normal operation. Where the loadings are still sufficiently low that the spring pack 34 is able to resist significant axial movement of the actuator member 10 then the no-back device 26 will continue to operate as outlined hereinbefore, and it will be appreciated that the magnitude of the braking load applied by the no-back device 26 is related to the magnitude of the applied tensile loading. However, where the applied tensile loading is sufficient to cause axial movement of the actuator member 10 bringing the shoulder 40 of the limit means 28 into contact with the load disc 42, then it will be appreciated that further compression of the spring pack 34 is not possible. Consequently, once this point is reached, the braking load applied by the no-back device 26 no longer rises with increasing tensile loadings but rather is capped. The level at which it is capped is selected so as to ensure that the risk of damage to the no-back device 26 to prevent subsequent operation thereof is reduced.

As the braking load applied by the no-back device 26 is capped in such circumstances, although it will continue to resist rotation of the actuator member 10 it will be unable to prevent rotation arising from the applied aerodynamic loads. Alternative means for resisting such rotation are provided. For example, the manner in which the motor is controlled may be such as to allow the motor to resist such rotation, the motor operating in a regenerative braking mode in which a brake resister is provided from which heat resulting from the operation in this mode will need to be dissipated. The resistance applied by the motor will slow the extension of the actuator, rather than stop extension, thus the cowl will continue to move towards its deployed position, but in a controlled manner.

It will be appreciated that the use of a no-back arrangement of this type allows movement of the cowl to its deployed position in a controlled manner in an RTO situation, without requiring the provision of a no-back of increased size and weight or gain, and hence avoiding the need to use a larger motor.

In the arrangement shown in FIG. 1 the load disc 42 bears against a load limiter device 44 operable such that in the event of a further increase in the applied tensile load then, not only will the output of the no-back device 26 be capped as described hereinbefore, but also the load limiter device 44 will serve to react torque between the actuator member 10 and the housing 12. However, the provision of a load limiter device 44 may not always be required, and the invention is applicable to arrangements in which no such device, or an alternative design of load limiter device, is provided.

FIG. 2 illustrates an arrangement that is very similar to that shown in FIG. 1 and described hereinbefore, and like reference numerals are used herein to denote like parts. Only the significant differences between the arrangements of FIGS. 1 and 2 are described herein, and it will be understood that other than as described herein the embodiments, and the manner in which they operate, are substantially the same.

In the arrangement shown in FIG. 2, the shoulder 40 of the limit means 28, rather than being formed integrally with the rotary actuator member 10, is defined by an end face of a nut 40a secured by means of screw thread formations to the rotary actuator member 10. Although provided upon a separate component, as the nut 40a is rigidly secured to the rotary actuator member 10, the manner in which the no-back arrangement operates is not altered by this change, although manufacture and assembly thereof is thought to be simplified by the provision of the abutment 40 upon the nut 40a. By virtue of the provision of the nut 40a, the thrust bearing 41 is supported upon part of the nut 40a rather than upon part of the rotary actuator member 10.

Another difference between the arrangements of FIGS. 1 and 2 is that in the arrangement of FIG. 2 a bearing support 32a is provided for the no-back disc 32, supporting the no-back disc 32 and assisting in ensuring that the no-back disc 32 is able to rotate freely relative to the rotary actuator member 10. The bearing support 32a and pressure plate 38 are both keyed or otherwise secured so as to be rotatable with the actuator member 10.

Additionally, detailed changes to the shapes of certain of the components have been made, and shims or the like provided to permit or assist in setting up of the no-back arrangement.

A number of modifications or alterations may be made to the arrangement described hereinbefore without departing from the scope of the invention.

The invention claimed is:

1. A no-back arrangement for use in applying a braking load to a rotary actuator member, the no-back arrangement comprising:
   a no-back device operable to apply a braking load to the rotary actuator member when the rotary actuator member is subject to a tensile loading, the no-back device being operable to increase the braking load with increasing tensile loading, wherein the no-back device comprises a friction disk resiliently compressed against a no-back disk by a spring arrangement compressed by longitudinal movement of the rotary actuator member, the no-back disk allowing for rotation in only one direction when member is deployed; and
   limit means operable to limit the magnitude of the applied braking load, the limit means being operable to limit the compression of the spring arrangement, the limit corresponding to a selected tensile loading, and allow rotation of the rotary actuator arising from tensile loading greater than the selected tensile loading.

2. An arrangement according to claim 1, further comprising means for resisting movement of the actuator member under overload conditions.

3. An arrangement according to claim 2, wherein the means for resisting comprises a control arrangement for controlling the operation of an associated motor.

4. An arrangement according to claim 2, wherein the means for resisting comprises a mechanical load limiter.

5. An arrangement according to claim 1, wherein the spring arrangement comprises a disc spring pack.

6. An arrangement according to claim 1, wherein the limit means comprises a shoulder provided on the actuator member co-operable with an abutment after limited longitudinal movement of the actuator member has taken place.

7. An arrangement according to claim 6, wherein the shoulder is provided upon a component mounted upon the actuator member.

8. An arrangement according to claim 6, wherein the abutment is associated with a load limiter device operable to resist rotation of the actuator member in the event of further longitudinal movement of the actuator member.

9. An arrangement according to claim 6, wherein the shoulder is integral with the actuator member.

10. An actuator comprising a rotary actuator member and a no-back arrangement operable to apply a braking load to a rotary actuator member when the rotary actuator member is subject to a tensile load, the no-back arrangement comprising:
    a no-back device operable to apply a braking load to the rotary actuator member when the rotary actuator member is subject to a tensile loading, the no-back device being operable to increase the braking load with increasing tensile loading, wherein the no-back device comprises a friction disc resiliently compressed against a no-back disc by a spring arrangement compressed by longitudinal movement of the rotary actuator member, the no-back disk allowing for rotation in only one direction when member is deployed; and
    limit means operable to limit the magnitude of the applied braking load, the limit means being operable to limit the compression of the spring arrangement the limit corresponding to a selected tensile loading, and allow rotation of the rotary actuator arising from tensile loading greater than the selected tensile loading.

* * * * *